US010942663B2

(12) United States Patent
Rao et al.

(10) Patent No.: US 10,942,663 B2
(45) Date of Patent: Mar. 9, 2021

(54) INLINING DATA IN INODES

(71) Applicant: EMC IP Holding Company LLC, Hopkinton, MA (US)

(72) Inventors: Attilio Rao, Rome (IT); Dmitri Chmelev, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/260,991

(22) Filed: Jan. 29, 2019

(65) Prior Publication Data
US 2020/0241783 A1    Jul. 30, 2020

(51) Int. Cl.
*G06F 3/06* (2006.01)
*G06F 16/901* (2019.01)
*G06F 12/02* (2006.01)

(52) U.S. Cl.
CPC .......... *G06F 3/0641* (2013.01); *G06F 3/0608* (2013.01); *G06F 3/0671* (2013.01); *G06F 12/0238* (2013.01); *G06F 16/9027* (2019.01)

(58) Field of Classification Search
CPC .... G06F 3/0641; G06F 3/0608; G06F 3/0671; G06F 16/9027; G06F 12/0238
See application file for complete search history.

(56) References Cited

U.S. PATENT DOCUMENTS

| 7,711,539 B1* | 5/2010 | Kimmel | G06F 3/0622 703/23 |
| 8,539,184 B2* | 9/2013 | Dudgeon | G06F 3/0608 711/114 |
| 9,886,532 B1* | 2/2018 | Scallon | G06F 17/5009 |
| 2005/0097142 A1* | 5/2005 | Best | G06F 3/0608 |
| 2007/0094269 A1* | 4/2007 | Mikesell | G06F 11/1435 |
| 2008/0313241 A1* | 12/2008 | Li | G06F 11/1076 |
| 2008/0320052 A1* | 12/2008 | Chandrachari | G06F 16/13 |
| 2010/0070733 A1* | 3/2010 | Ng | G06F 12/0246 711/171 |
| 2017/0192892 A1* | 7/2017 | Pundir | G06F 12/0873 |

(Continued)

OTHER PUBLICATIONS

"Wang Li, Liao XiangKe, Xue JingLing, Weil Sage, Wen YunChuan, and Yang XueJun, Enhancement of cooperation between file systems and applications—VFS extensions for optimized performance, Sep. 2015, Science China Information Sciences, vol. 58, pp. 5-6" (Year: 2015).*

(Continued)

*Primary Examiner* — Yaima Rigol
*Assistant Examiner* — Kendrick Lam
(74) *Attorney, Agent, or Firm* — Amin, Turocy & Watson, LLP

(57) ABSTRACT

Techniques are provided for inlining data in inodes of a file system. In an example, data (e.g., a file) is to be written to storage. Where the data is small enough to fit in an inode, it can be written to a dynamic area of the inode. Where dynamic attributes of the inode conflict with storing the data, the dynamic attributes can be spilled to a metadata block. Where the inlined data becomes too large to be stored in the inode, it can be spilled to a data block, and a metadata tree can be written to the inode. Where data that was previously too large to inline is truncated so that now it can be written to the inode, the data is inlined in the inode from a data block.

20 Claims, 13 Drawing Sheets

(56) References Cited

U.S. PATENT DOCUMENTS

2017/0329541 A1* 11/2017 Hayasaka ............... G06F 3/064
2018/0307436 A1* 10/2018 Wang .................... G06F 3/0604

OTHER PUBLICATIONS

"Oracle, Database Concepts, Logical Storage Structures, Nov. 2014, Oracle Help Center, https://docs.oracle.com/cd/E11882_01/server.112/e40540/logical.htm#CNCPT004" (Year: 2013).*

"Aliyun, mkfs command explanation, Nov. 15, 2017, Aliyun, https://yq.aliyun.com/articles/512163" (Year: 2017).*

* cited by examiner ly, bolding US 10,942,663 B2

INLINING DATA IN INODES

TECHNICAL FIELD

The present application relates generally to techniques for storing data in a computer file system, and more specifically, to inlining data in an Mode of a computer file system.

BACKGROUND

A file system can comprise a plurality of data files, along with a plurality of inodes, which contain metadata about the data files. In some embodiments, a file system can be implemented on a distributed storage system that can comprise one or more clusters, where a cluster comprises one or more nodes unified into a single shared computing resource.

BRIEF DESCRIPTION OF THE DRAWINGS

Numerous aspects, embodiments, objects, and advantages of the present invention will be apparent upon consideration of the following detailed description, taken in conjunction with the accompanying drawings, in which like reference characters refer to like parts throughout, and in which.

DETAILED DESCRIPTION

OVERVIEW

Figure 1:
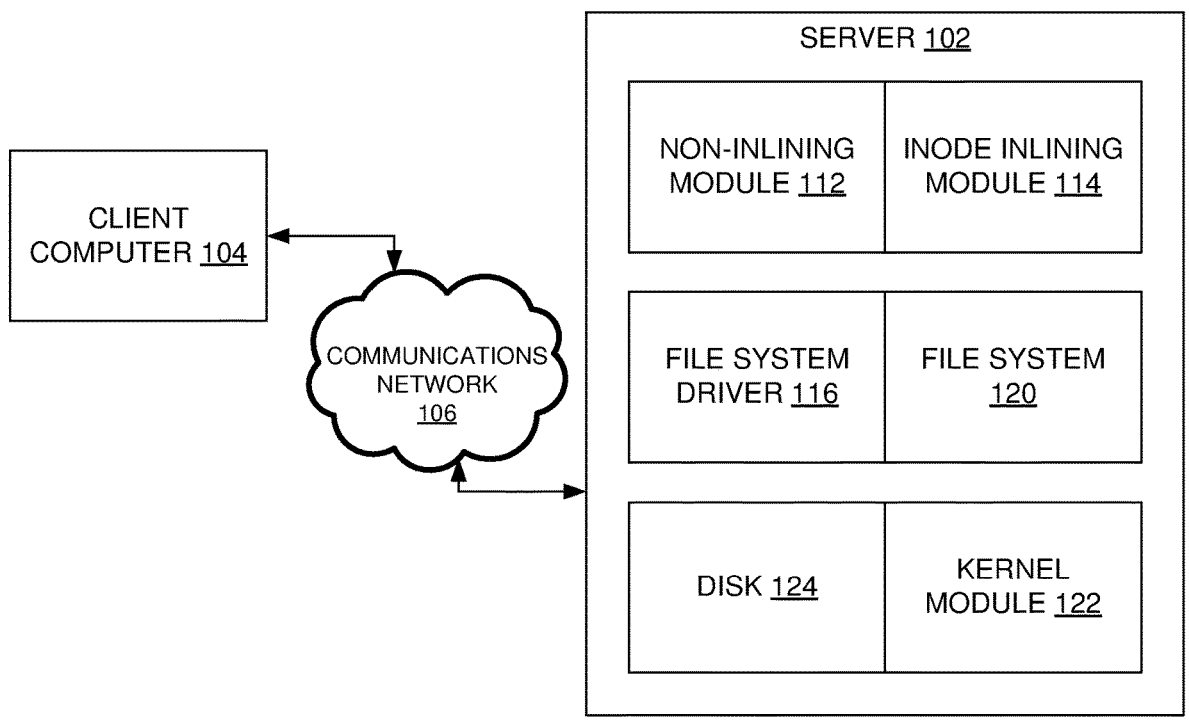
FIG. 1 illustrates a block diagram of an example system that can facilitate inlining data in inodes, in accordance with certain embodiments of this disclosure.

As described herein, a distributed storage system can have an operating system. The operating system can provide updates to one or more remote computers about changes to files in the distributed storage system, using an application-layer network protocol. The present disclosure generally describes embodiments where the distributed storage system can be an EMC Isilon Cluster distributed storage system, and the file system can be an EMC Isilon File System (IFS). It can be appreciated that there are other embodiments that utilize different technologies than described herein. It can further be appreciated that there are embodiments that are implemented on computers that are not part of a distributed storage system.

Over time, hard disk drive sizes have generally increased, and with that, the minimum amount of space that a disk block occupies has also generally increased. As this minimum amount of space to write to disk increases, unused space in inodes of a file system can increase. This space in an inode can be used to store metatree information and/or dynamic attributes. As an otherwise-unused space in an inode grows based on disk size sector growing, more information can be stored in the unused space, such as by inlining data storage in an inode.

In some examples, where a minimum write size to disk is 4 kibibytes (KiB), an inode size can be 8KiB. An 8KiB inode has the same size of a data block, in some examples, and using this size can simplify creating such a system, and reduce computing resources used in block management. In an example 8KiB inode (and in an example 512 byte (B) inode), a static area of the inode can be 134B. This then leaves a large portion of the inode unutilized. This unutilized space can be referred to as a dynamic dinode area, and can then be used to cache values that are often associated with metadata and data operations. For example, a dynamic dinode area can be used to store information about a metatree, as well as dynamic attributes of a corresponding file.

The content of the dynamic dinode area can be dynamic during a lifetime of a corresponding inode, and where a metatree or dynamic attributes grow to a size that exceeds that allowed in the inode (which can be referred to as spilling), this data can be spilled to another block.

With larger free space within an 8KiB inode as compared to smaller inodes, there is more room for other types of optimizations. For example, this space can be used to inline file data content directly into an inode, when the data is of an appropriate size.

Data inlining can comprise using an inode's dynamic dinode area to store file content, rather than allocating and using separate data blocks. In some examples, this can be done where a file is smaller than a corresponding dynamic dinode area size. Such a data inlining approach can have various advantages. For example, where inlining eliminates the use of a data block, then a metatree can be omitted. In examples, inodes are mirrored, so inlined data is mirrored, without using a protection group for the data. For a rotational disk, fewer seeks can be involved in data storage and access. For a solid state drive (SSD), fewer blocks can be allocated and written, which can extend a lifetime of the SSD. By using mirroring of an inode to protect its inlined data, computing resources used for forward error correction (FEC) and cyclic redundancy checks (CRC) are conserved. There can be a reduced overhead for read and write operations due to the above. Where data blocks are not used because the data is inlined, there is no data width-device list (WDL; a bitmap of drive that are storing data for a file for optimizing repair processing) associated with the inode (and there can be no metadata WDL as well). Data restriping can become irrelevant because inode restriping restripes the data that is inlined in the inodes. Data inlining can generally reduce storage overhead. There can be a diskpool consolidation between data and metadata, which can cut the participant fanout per transaction.

To effectuate inline data, the size of an inlined file can be no larger than the space available in a dinode. This can lead to optimization for small files, where a small file is one that can fit into an inode's dynamic area Inline data support can be developed to reduce fallouts, increase performance and space gain, and avoid complicating corresponding Referring to 512B inodes, they can have the following format. A 512B inode can be partitioned to have a static section at the beginning of the inode block that is 134B long, and can be represented in computer memory as a struct ifs dinode. Following the static section, there can be an initially-empty 389B dynamic section, which can store dynamic content. Finally, there can be a 9B idi checkcode.

The dynamic section can be used both to cache metatree information, as well as dynamic attributes. The metatree information (e.g., an identification of a root and inner blocks) can be added to the beginning of the dynamic area, just below the static section, and then grow toward the end of the dynamic area. Then, dynamic attributes can be added just above the idi verification section, at the end of the dynamic area, and grow toward the beginning of it.

While the metatree information and dynamic attributes grow, they can intersect, or fill the dynamic area. Where the growing metatree information can no longer fit into the dynamic area, it can be spilled into a metatree block. Where the growing dynamic attributes can no longer fit into a dynamic area, the metatree information can also be spilled into a metatree block. This example can be considered to be a "dynamic attribute preference" approach.

Inlining data in inodes can be considered to be a performance optimization, and implementation of inlining data can mediate between an improved inlining data design, and complicating existing code paths (where implemented at least in part with computer-executable instructions). As such, in some examples, an approach that minimizes a risk of regressions of a system can be implemented to perform data inlining in conditions where it is convenient and cheap in terms of computing resources.

In some examples, both 512B disks and 4KiB disks can be used in the same diskpool and node of a distributed storage system, and these mixed configurations can be accounted for when it comes to data inlining.

In some examples, data inlining can be selectively enabled and/or disabled. In some examples, selectively enabling and/or disabling data inlining can be implemented for debugging and testing reasons, or to evaluate a particular customer workload to determine how data inlining affects that customer's workload.

In some examples, inlining data can be implemented for inodes of at least a certain size. For example, inlining can be implemented for 8KiB inodes, and not implemented for 512B inodes. A reason for this can be that, a 512B inode can have only 389B of dynamic area, so only particularly small files can be inlined in it. And some of that 389B can be occupied by mandatory cached dynamic attributes.

In other examples, data inlining can be implemented for 512B inodes. An example of such a scenario is where many files that are small enough to inline (e.g., <300B) are used.

Inlining data can be implemented on a per-directory basis for a file system. For example, each directory of a file system can be configured to either permit data inlining for files stored within that directory, or not permit data inlining for files stored within that directory.

The following is an example implementation of data inlining in inodes, using a OneFS file system-type architecture. In an example, data inlining is kept off by default. On empty directories, data inlining can then be enabled via a "isi set" toggle. This attribute gets inherited by all children. An example toggle could be: isi set –i (on-off)/ifs/DIR/. In order to serve already populated directories, a new SmartPool rule can be added to start a SmartPool job that will inline or spill the files present.

Where there is no data block for an inlined file, a metatree can be omitted. Inline data then can become a replacement of the metatree, with some differences, as described herein. Inlined data can be stored into an inode's dynamic area just after the static area, and grow top-down (similar to how a metatree can grow in examples where an inode comprises a metatree). Dynamic attributes can be stored just above idi verification bytes, and grow bottom-up.

In some examples, 389B can be reserved for the dynamic attributes, and be considered to be pre-allocated, so that inline data is be stored in this space. In an example with 8KiB inodes, that can leave 7,680B for inlining data. This approach of reserving 389B for dynamic attributes can be done to maintain consistency with 512B inodes, and simplify the system. In some 512B inodes, 389B are reserved for metatree information and dynamic attributes. Where there is no metatree information (because data is inlined), then that 389B is reserved for dynamic attributes.

An inlined data stream can grow until the 7,680B limit is reached. At that time, if more space is needed to store the data, then the data can be spilled. Spilling data in this manner can involve a conventional write to a data block, where the inode has metatree information that references that data block, and there is a corresponding protection block(s) and protection group.

Where dynamic attributes grow beyond the reserved 389 bytes, they can overflow into the rest of the inode's dynamic area. If, after the dynamic attributes overflow into the rest of the inode's dynamic area, the dynamic attributes and the inlined data collide (i.e., they combine to occupy more than the 7,680B of space reserved for the dynamic area), then the dynamic attributes that exceed the reserved 389B can be spilled to make room for more inline data. This approach can correspond to a behavior for how 512B inodes are treated, which can reduce a performance regression associated with inlining data. This approach can also restrict data spilling to a known write path of the system, so this approach can be added to an existing system while leveraging system components to writing data. These existing system components can include writing the data, determining a layout, and generating a protection group.

Additionally, where an upper limit for inline data size is predetermined (e.g., the upper limit is 7,680B in an 8KiB inode), it can be determined before performing a data write whether the write can be inlined or not before calculating layout, allocating protection groups, and the like.

In some experimental examples, dynamic attributes can take below 40B in market highly relevant workloads. Given that, it can be reasonable to assume that, for some system architectures, dynamic attributes generally will not spill.

There can be other approaches to implementing inlining data in inodes. One example is to treat data content like a dynamic attribute and store it directly into the dynamic area.

In some embodiments, dynamic attributes can be prioritized over each other, and when dynamic attributes spill from an inode, lower-priority dynamic attributes can be spilled rather than higher-priority dynamic attributes (or data). This can be expressed as caching the optimal content in the inode, which can be data and higher-priority dynamic attributes.

EXAMPLE ARCHITECTURES

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

FIG. 1 illustrates a block diagram of an example system 100 that can facilitate inlining data in inodes, in accordance with certain embodiments of this disclosure. The example of system 100 involves a client-server architecture, and it can be appreciated that other architectures can be used to facilitate inlining data in inodes. System 100 comprises server 102, client computer 104, and communications network 106. Client computer 104 can be implemented using aspects of computer 1302 of FIG. 13. Communications network 106 can comprise a computer communications network, such as the Internet.

Figure 13:
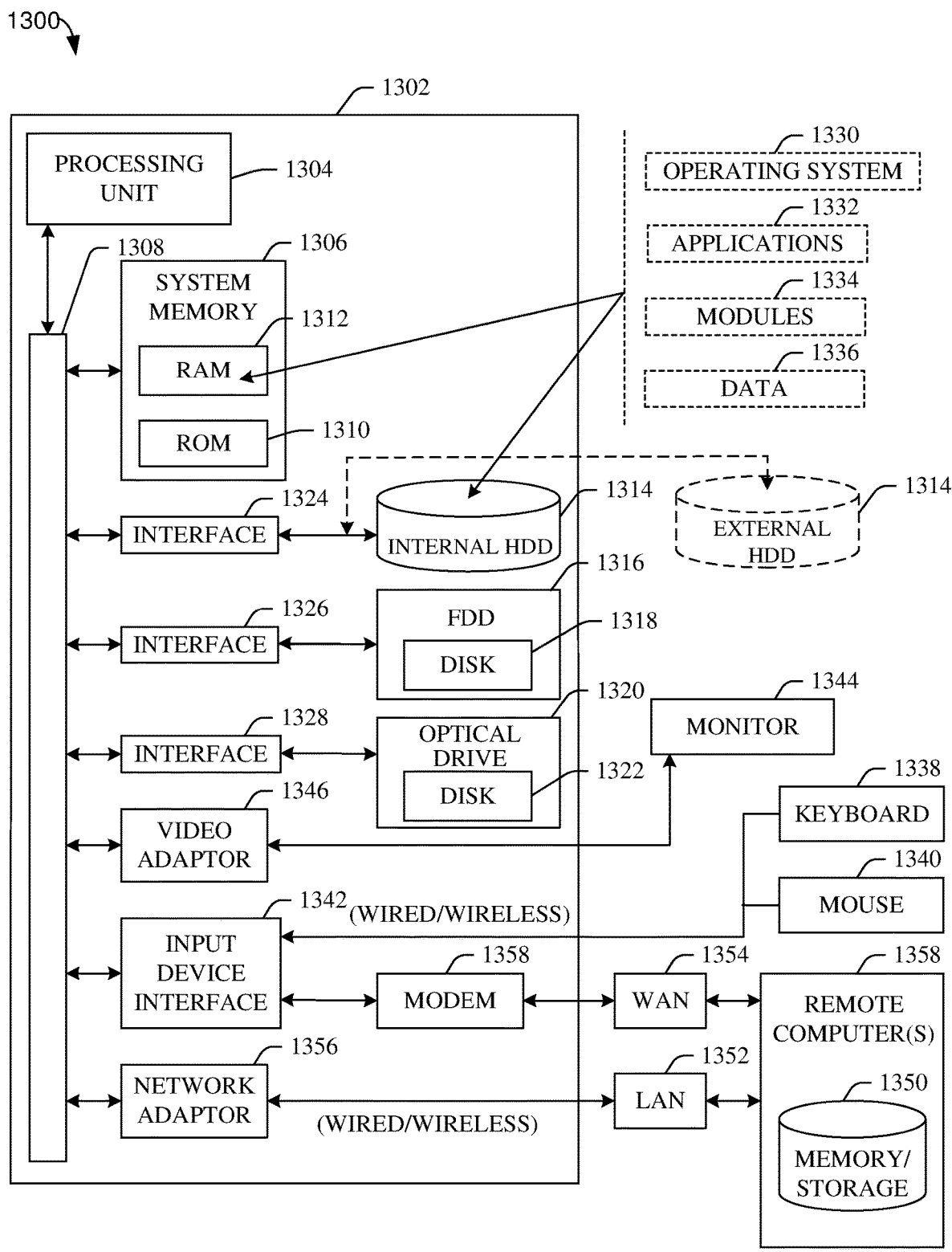
FIG. 13 illustrates an example block diagram of a computer operable to execute certain embodiments of this disclosure.

Server 102 can be implemented using aspects of computer 1302 of FIG. 13. In some examples, server 102 can effectuate a distributed storage system. It can be appreciated that server 102 is presented logically, and that there can be embodiments where server 102 comprises multiple computers. In some examples, server 102 can implement an IFS or a OneFS file system.

As depicted, server 102 comprises non-inlining module 112, inode inlining module 114, file system driver 116, file system 120, kernel module 122, and disk 124.

Inode inlining module 114 can comprise one or more instances of a process that implements data inlining in inodes in a file system, such as file system 120. In some examples, inode inlining module can implement aspects of process flow 900 of FIG. 9, process flow 1000 of FIG. 10, process flow 1100 of FIG. 11, and/or process flow 1200 of FIG. 12. Non-inlining module 112 can comprise one or more instances of a process that implements storing data in a file system, such as file system 120, without inlining data in an inode. It can be appreciated that the components of system 100 are depicted logically, and that there can be embodiments where inode inlining module 114 and non-inlining module 112 are implemented with the same process.

File system driver 116 can comprise a computer device driver that provides access to a file system (in which data inlining can be implemented) of server 102 to one or more applications or modules of server 102, such as inode inlining module 114 and non-inlining module 112. File system 120 can comprise an organization of data on server 102 into one or more files and/or directories that can contain files and inodes. Kernel module 122 can provide some operating system functions for server 102, such as file management and resource allocation. File system 120 can store one or more files in disk 124.

Server 102 can store and maintain one or more computer files, which can, in turn, be accessed by client computer 104. In some examples, client computer 104 can access these files on server 102 via a server message block (SMB) protocol.

In some examples, client computer 104 can send server 102 requests to perform transactions that include modifying a file of server 102.

When server 102 receives a request to perform a transaction that includes modifying a file, this request can be directed to file system driver 116. File system driver 116 can communicate with kernel module 122, which can be responsible for receiving file change events and implementing those events (e.g., modifying a file). Then, inode inlining module 114 and non-inlining module 112 (which can each be part of file system 120) can determine that such a file event can involve creating a file, or modifying the size of a file so that the file is moved from inlined to non-inlined (i.e., the file is now too large for inlining), or modifying the size of a file so that the file is moved from non-inlined to inlined (i.e., the file is now small enough to be inlined). These functions are described in more detail below.

Figure 2:
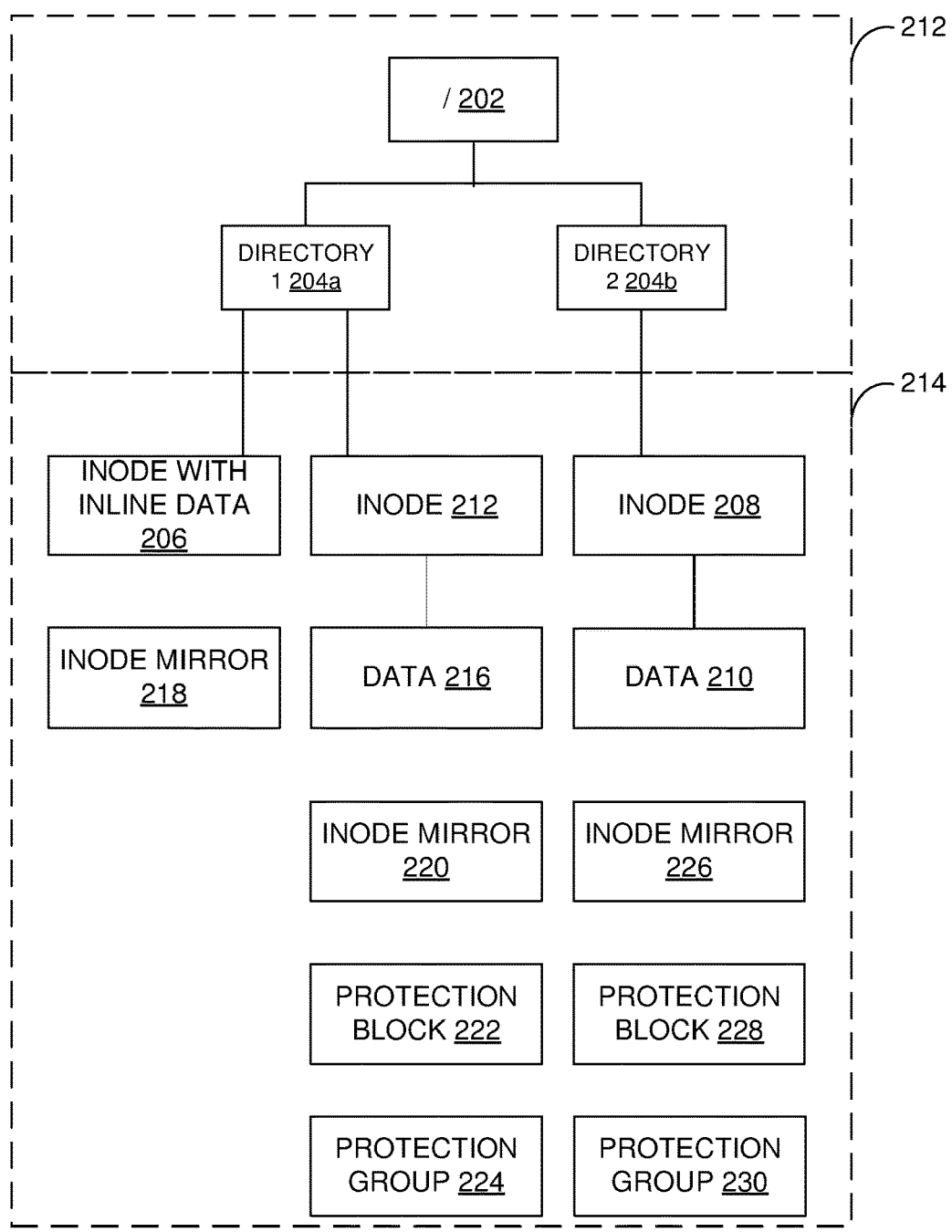
FIG. 2 illustrates a file system architecture that can facilitate inlining data in inodes, in accordance with certain embodiments of this disclosure.

FIG. 2 illustrates a file system architecture 200 that can facilitate inlining data in inodes, in accordance with certain embodiments of this disclosure. In some examples, aspects of file system architecture 200 can be used to effectuate file system 120 of FIG. 1. File system architecture 200 comprises logical file system 212 and data blocks on disk 214. In turn, logical file system 212 comprises root directory 202, directory 1 204a, and directory 2 204b. Each of root directory 202, directory 1 204a, and directory 2 204b can be a directory in a UNIX-type file system.

As depicted, directory 1 204a comprises a directory for which inlining data in inodes is permitted (but not required, such as where a file is larger than a predetermined threshold size of files to inline) As depicted, directory 2 204b comprises a directory for which inlining data in inodes is not permitted (i.e., regardless of a size of a file, that file will be stored in one or more data blocks rather than being inlined in an inode).

Both directory 1 204a and directory 2 204b refer to data stored in data blocks on disk 214. Data blocks on disk 214 comprises inode with inline data 206, inode 208, data block 210, inode 212, and data block 216. Directory 1 204a contains files that are stored with inline data inode 206, inode 212, data block 216, inode mirror 218 (which mirrors inline data inode 206), inode mirror 220 (which mirrors inode 212), and protection block 222 and protection group 224 (which provide data integrity protection for the data in data block 216). Inode with inline data 206 stores an associated data file in the inode itself. An example for why this is the case can be that inlining is permitted for this directory, and the data file is small enough to store in an inode. Then, inode 212 is an inode that references a data file that is stored in data block 214. An example for why this is the case can be that inlining is permitted for this directory, but the data file is too large to store in an inode. While in this example a file is depicted as being stored in a single data block, it can be appreciated that there are files that are stored across multiple data blocks, and that similar techniques can be applied to multiple data block scenarios.

Directory 2 204b contains a file that is stored with a data block. Inode 208 is an inode that references a data file that is stored in data block 210, inode mirror 226 (which mirrors inode 208), and protection block 228 and protection group 230 (which provide data integrity protection for the data in data block 210). An example for why this is the case can be that inlining is not permitted for this directory, regardless of a file's size.

Figure 3:
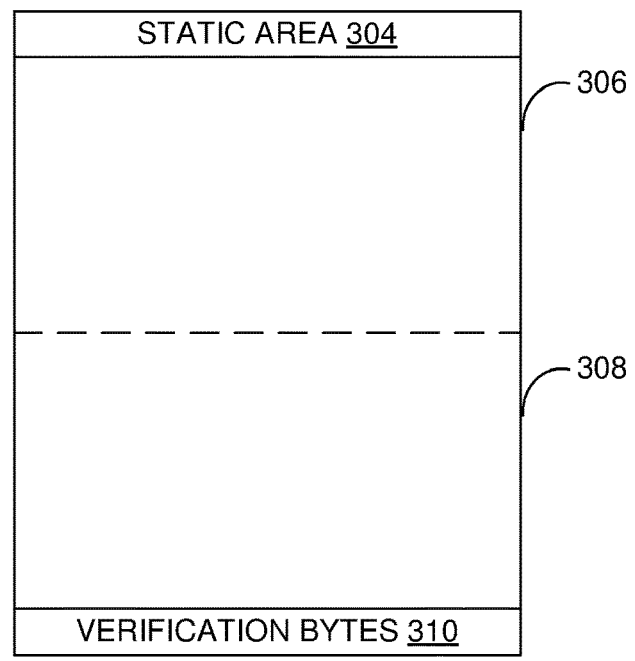
FIG. 3 illustrates an example inode that can facilitate inlining data in inodes, in accordance with certain embodiments of this disclosure.

FIG. 3 illustrates an example inode 300 that can facilitate inlining data in inodes, in accordance with certain embodiments of this disclosure. In some examples, aspects of inode 300 can be implemented in file system 120 of FIG. 1. Static area 304 can comprise a fixed portion of inode 300 that stores information about inode 300. In examples where the size of inode 300 is 512 bytes or 8 kibibytes (KiB; 8,192 bytes), the size of the static area can be 134 bytes. Data area 306 can be a portion of inode 300 in which files are inlined. When data is written to data area 306, it can be written from the top down. That is, data can initially be written at a portion of data area 306 that abuts static area 304, and then data can be written progressively further away from static area 304 (i.e., toward verification 310). In some examples where inode 300 has a size of 8 KiB, data area 306 can store a file of up to 7,680 bytes in size.

Dynamic attributes area 308 can be a portion of inode 300 in which dynamic attributes about a file referenced by inode 300 are stored. The dynamic attributes can be written from the bottom up. That is, dynamic attributes can initially be written at a portion of dynamic attributes area 308 that abuts verification 310, and then dynamic attributes can be written progressively further away from verification 310 (i.e., toward static area 304). Verification 310 can be a fixed area of inode 300 that stores information used to validate that the information stored in inode 300 has not become corrupted.

Figure 4:
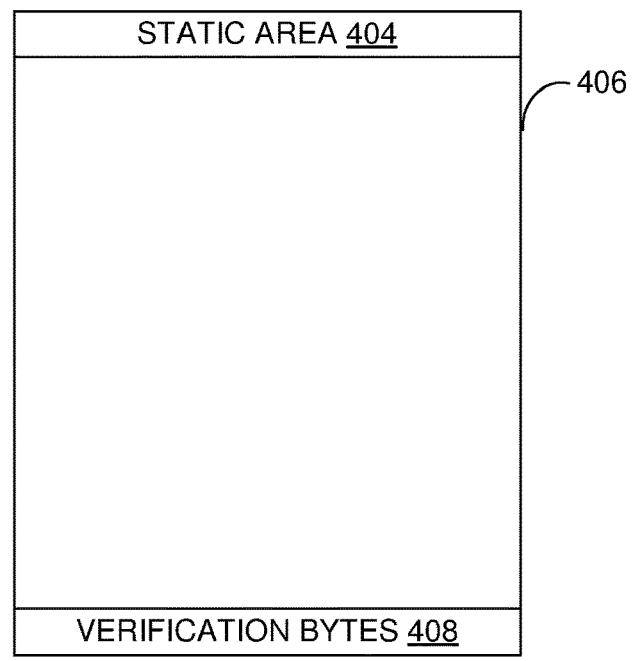
FIG. 4 illustrates another example inode that can facilitate inlining data in inodes, in accordance with certain embodiments of this disclosure.

FIG. 4 illustrates another example inode 400 that can facilitate inlining data in inodes, in accordance with certain embodiments of this disclosure. In some examples, aspects of inode 400 can be implemented in file system 120 of FIG. 1. Static area 404 can be similar to static area 304 of FIG. 3. Verification 408 can be similar to verification 310 of FIG. 3. Dynamic attributes and data area 406 can store both dynamic attributes (similar to dynamic attributes area 308 of FIG. 3) and data (similar to data area 306 of FIG. 3). These dynamic attributes and data can be written from the top down, similar to data area 306 of FIG. 3. The dynamic attributes and data of dynamic attributes and data area 406 can be written mixed together—that is, written in the order in which they are generated and written to inode 300 rather than separated based on whether it is a dynamic attribute or data that is being written.

Figure 5:
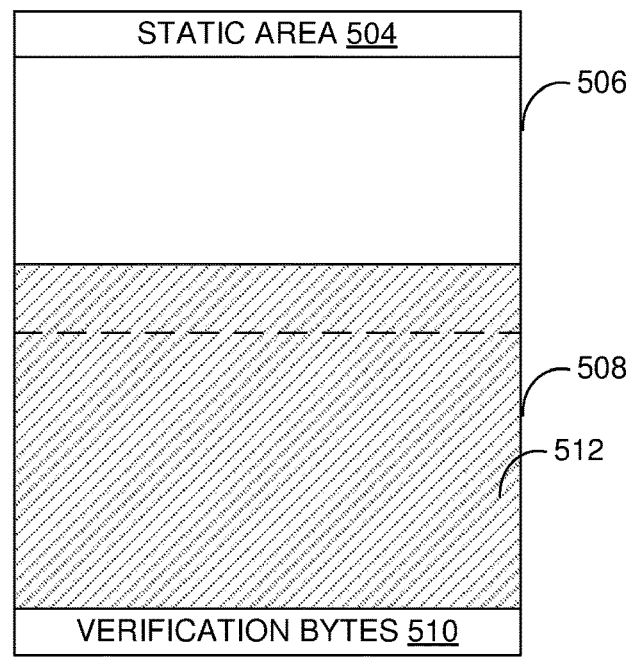
FIG. 5 illustrates an example inode that can store dynamic attributes beyond a reserved area for dynamic attributes, in accordance with certain embodiments of this disclosure.

FIG. 5 illustrates an example inode 500 that can store dynamic attributes beyond a reserved area for dynamic attributes, in accordance with certain embodiments of this disclosure. In some examples, aspects of inode 500 can be implemented in file system 120 of FIG. 1.

Static area 504, dynamic attributes and data area 506, dynamic attributes area 508, and verification bytes 510 can be similar to static area 304, dynamic attributes and data area 306, dynamic attributes area 308, and verification bytes 310 of FIG. 3, respectively. Stored dynamic attributes 512 is depicted as filling all of dynamic attributes area 508, and then overflowing into dynamic attributes and data area 506. Dynamic attributes can be inserted into dynamic attributes area 508 from the bottom (i.e., close to verification bytes 510). In some examples, when dynamic attributes fill the dynamic attributes area 508 area, they can overflow into dynamic attributes and data area 506, so long as that space is not already occupied by data. Data can be filled into dynamic attributes and data area 506 from the top (i.e., toward static area 504), so that there is room for the dynamic attributes that are growing from the bottom should the data not fill all of dynamic attributes and data area 506.

Figure 6:
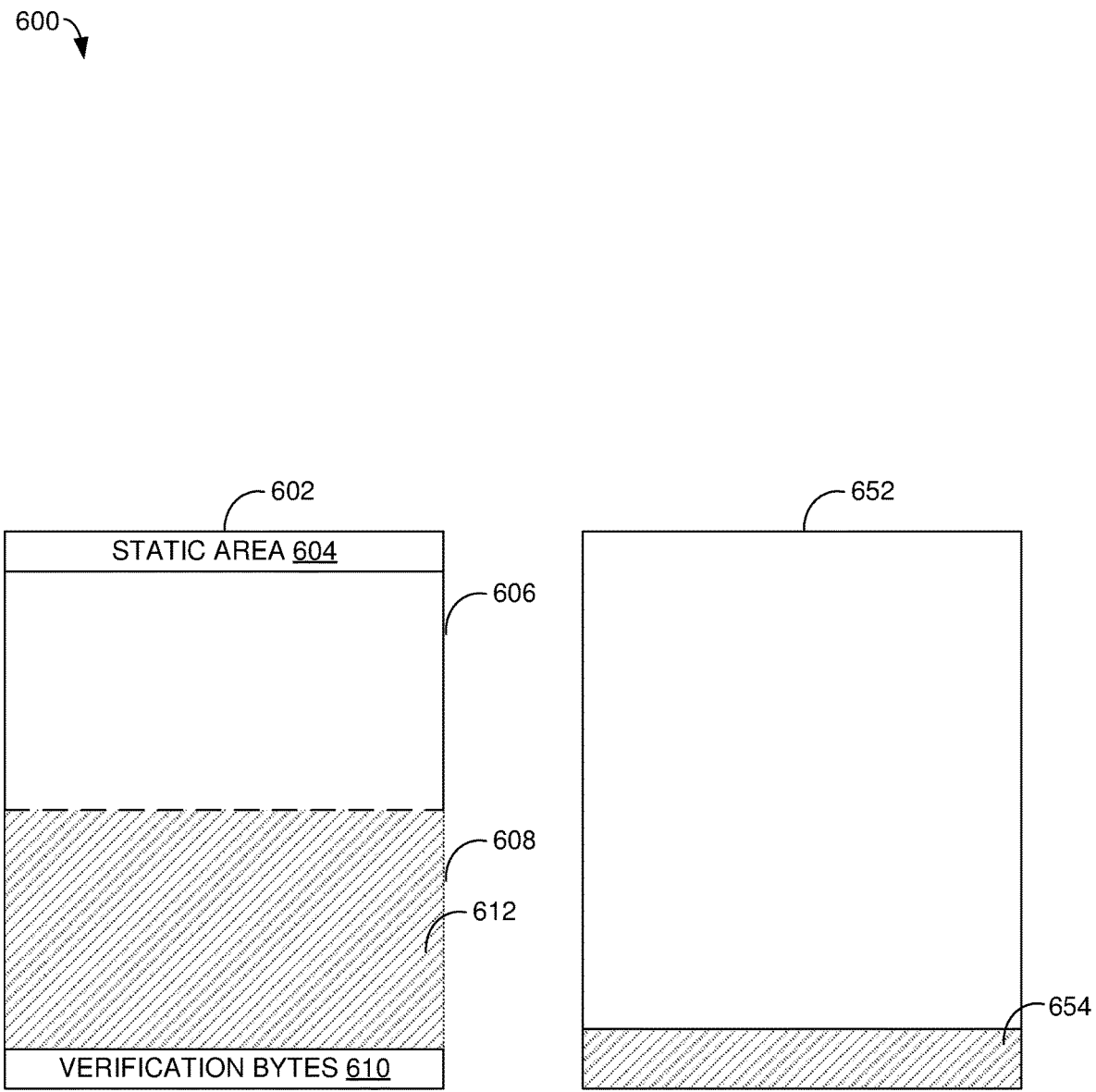
FIG. 6 illustrates the example inode of FIG. 5 where dynamic attributes stored beyond the reserved area for dynamic attributes are moved to another block, in accordance with certain embodiments of this disclosure.

FIG. 6 illustrates the example inode of FIG. 5 where dynamic attributes stored beyond the reserved area for dynamic attributes are moved to another block, in accordance with certain embodiments of this disclosure. Storage blocks 600 comprises inode 602 and metadata block 652. Inode 602 comprises static area 604, dynamic attributes and data area 606, dynamic attributes area 608, and verification bytes 610. Static area 604, dynamic attributes and data area 606, dynamic attributes area 608, and verification bytes 610 can be similar to static area 504, dynamic attributes and data area 506, dynamic attributes area 508, and verification bytes 510 of FIG. 5, respectively.

As can be seen, relative to dynamic attributes 512, dynamic attributes 612 has been truncated to fit within dynamic attributes area 608. A reason for this could be that there is a file to be stored in the inode that would occupy the entirety of dynamic attributes and data area 606, and it has priority for being stored in inode 602 over dynamic attributes.

It can be appreciated that there can be some examples where there is a collision between a file and dynamic attributes in an inode, but the file does not occupy the entirety of space allowed for it. So, some dynamic attributes could be removed from a dynamic attributes and data area to make room for the file, while other dynamic attributes could be left in the dynamic attributes and data area where there is otherwise free space for them.

As depicted, the truncated dynamic attributes—those that were in dynamic attributes and data area 606—have been moved to metadata block 652, and stored as dynamic attributes 654. As depicted in this example, dynamic attributes in metadata block 652 grow from the bottom up, and it can be appreciated that there can be examples where dynamic attributes in a metadata block are grown from the top down. As depicted, there are only dynamic attributes in metadata block 652. It can be appreciated that there can be examples where a metadata block stores other information, such as with a static area or verification bytes.

Figure 7:
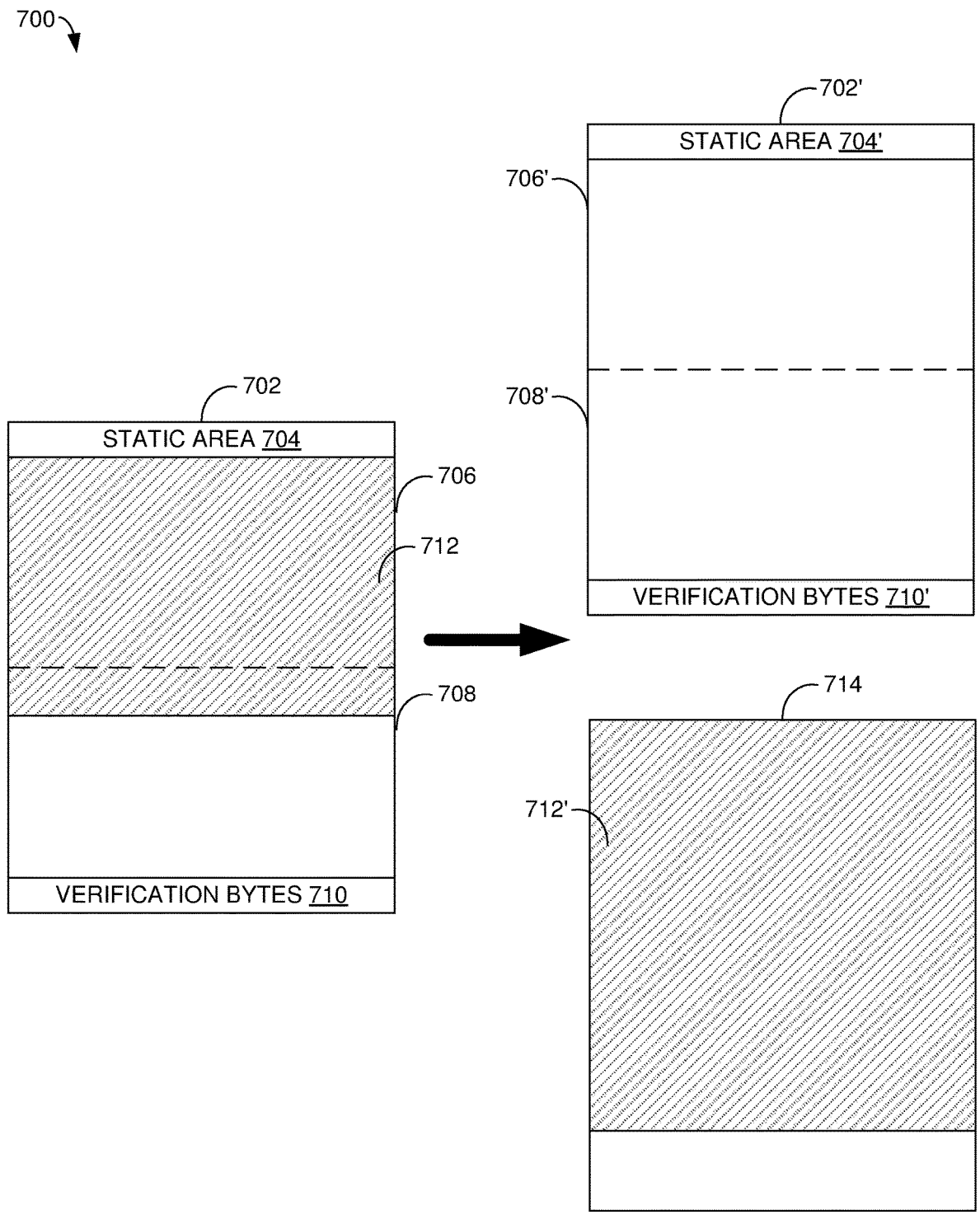
FIG. 7 illustrates example inodes where an inlined data file is moved to a data inode where the file is modified to have a size larger than is stored with inlining, in accordance with certain embodiments of this disclosure.

FIG. 7 illustrates example inodes where an inlined data file is moved to a data inode where the file is modified to have a size larger than is stored with inlining, in accordance with certain embodiments of this disclosure. In some examples, aspects of storage blocks 700 can be implemented in file system 120 of FIG. 1. Inode 702 comprises static area 704, dynamic attributes and data area 706, dynamic attributes area 708, and verification bytes 710. In some examples, static area 704, dynamic attributes and data area 706, dynamic attributes area 708, and verification bytes 710 can be similar to static area 304, dynamic attributes and data area 306, dynamic attributes area 308, and verification bytes 310 of FIG. 3.

Also depicted in inode 702 is data 712. In this example, data 712 was previously small enough to fit within dynamic attributes and data area 706. However, now data 712 has grown (e.g., by client computer 104 writing to a file that corresponds to data 712) and now cannot fit within dynamic attributes and data area 706. While data 712 is depicted as being stored within inode 702, this is not the case. Rather, data 712 is shown within inode 702 to illustrate how data 712 has grown and can no longer fit within dynamic attributes and data area 706. Instead, data 712 will be moved from inode 702 to a data block, which can be depicted as data block 714.

Inode 702' and data block 714 illustrate an example where data 712 is stored to a data block after it has grown too large to be inlined in inode 702. In this example, inode 702' represents inode 702 after data 712 is no longer inlined. Inode 702' comprises static area 704', dynamic attributes and data area 706', dynamic attributes area 708', and verification bytes 710', and these portions of inode 702' can be similar to portions of inode 702—static area 704, dynamic attributes and data area 706, dynamic attributes area 708, and verification bytes 710, respectively. In dynamic attributes and data area 706', inode 702' can store a metadata tree that references where the data is now stored in a data block (as well as other information, such as a protection block or a protection group that corresponds to the data block).

Then, data block 714 stores the now-larger file, which is now represented as data 712'. In some examples, a data block can store other information, such as a static area or verification bytes. In some examples, data 712' can be written to data block 714 (and a metadata tree written to inode 702') by invoking a call to file system driver 116 of FIG. 1 to write to file system 120. In some examples, an area in inode 702' that formerly stored data is de-allocated, or otherwise noted as being free to write information to.

Figure 8:
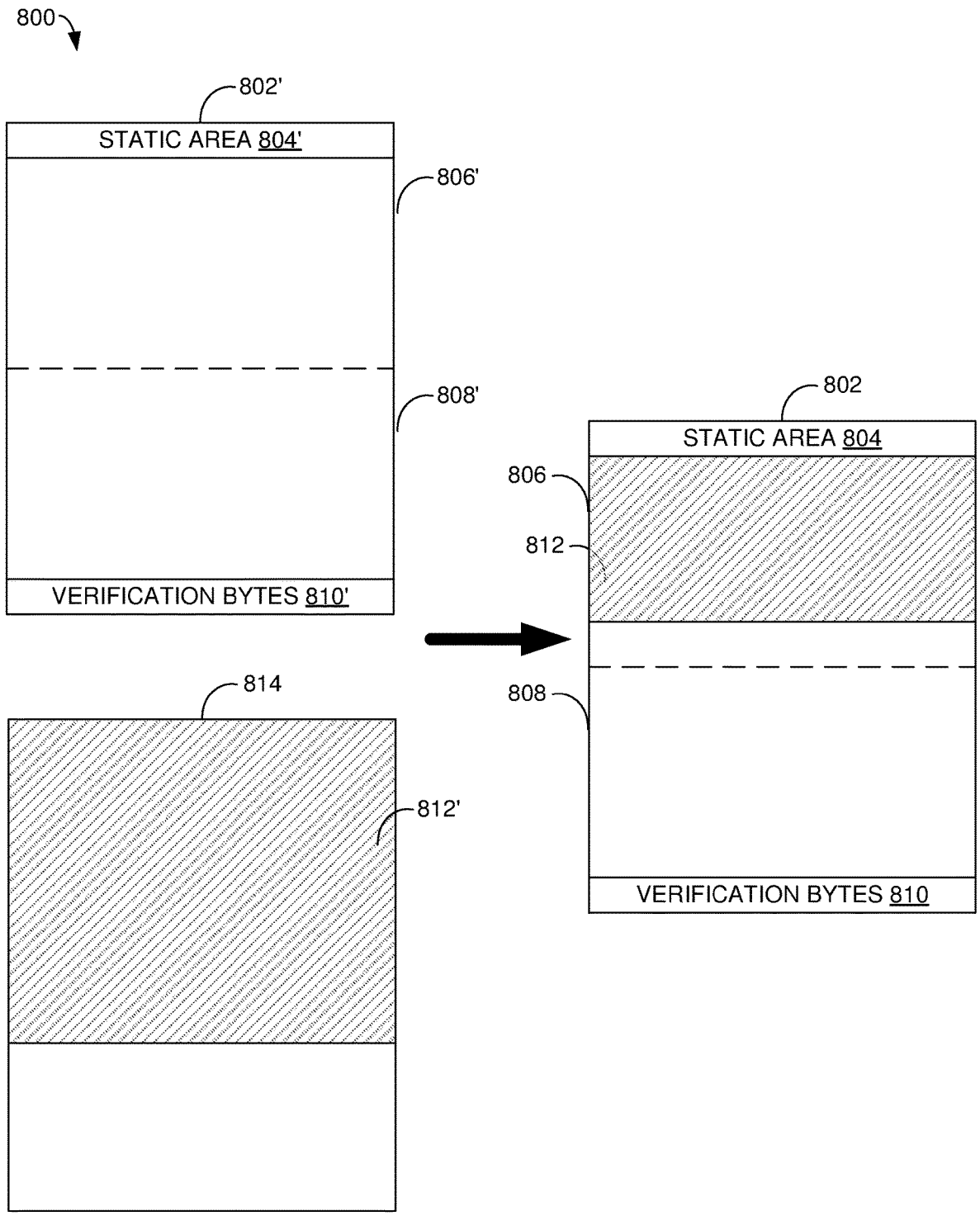
FIG. 8 illustrates an example inode where a data file is that is too large to be inlined is truncated so that it is a size that can be inlined, in accordance with embodiments of this disclosure.

FIG. 8 illustrates an example inode where a data file is that is too large to be inlined is truncated so that it is a size that can be inlined, in accordance with embodiments of this disclosure. In some examples, aspects of storage blocks 800 can be implemented in file system 120 of FIG. 1. In some examples, storage blocks 800 represent the reverse of storage blocks 700. With storage blocks 700, data goes from being inlined in an inode to be stored in a storage block. Here, with storage blocks 800, data goes from being stored in a storage block to being inlined in an inode.

At a first time, there are data block 814 (which stores data 812'), and inode 802'. Data block 814 can be similar to data block 712 of FIG. 7. Inode 802' comprises static area 804', dynamic attributes and data area 806', dynamic attributes area 808', and verification bytes 810', and these portions of inode 802' can be similar to portions of inode 702' of FIG. 7—static area 704', dynamic attributes and data area 706', dynamic attributes area 708', and verification bytes 710', respectively.

Data block 814 stores data 812'. In an example, data 812' was too large to inline into an inode, so was stored in a data block. Now data 812' is smaller (e.g., the file associated with data 812' was truncated) and it is small enough to inline In some examples, data 812' will be switched to being inlined in an inode when it is small enough, rather than first being written back to data block 814. Here, data 812' is depicted as being stored in data block 814 to convey that the data starts with being stored in a data block before being inlined to an inode.

Inode 802 then depicts a second time. Inode 802 comprises static area 804, dynamic attributes and data area 806, dynamic attributes area 808, and verification bytes 810, and these portions of inode 802 can be similar to portions of inode 802'—static area 804', dynamic attributes and data area 806', dynamic attributes area 808', and verification bytes 810', respectively. Then, inode 802 stores data 812 (which can represent data 812' at this second time) in dynamic attributes and data area 806 because data 812 is now small enough to inline in an inode.

In this example, a portion of computer storage corresponding to data block 814 has been de-allocated, or otherwise made available to store something else, because data block 814 is no longer storing data. It can be appreciated that there can be other blocks of computer storage that can be de-allocated when switching data from being stored in a data block to being inlined in an inode—e.g., blocks of computer storage corresponding to a protection block or a protection group of data block 814.

EXAMPLE PROCESS FLOWS

Figure 9:
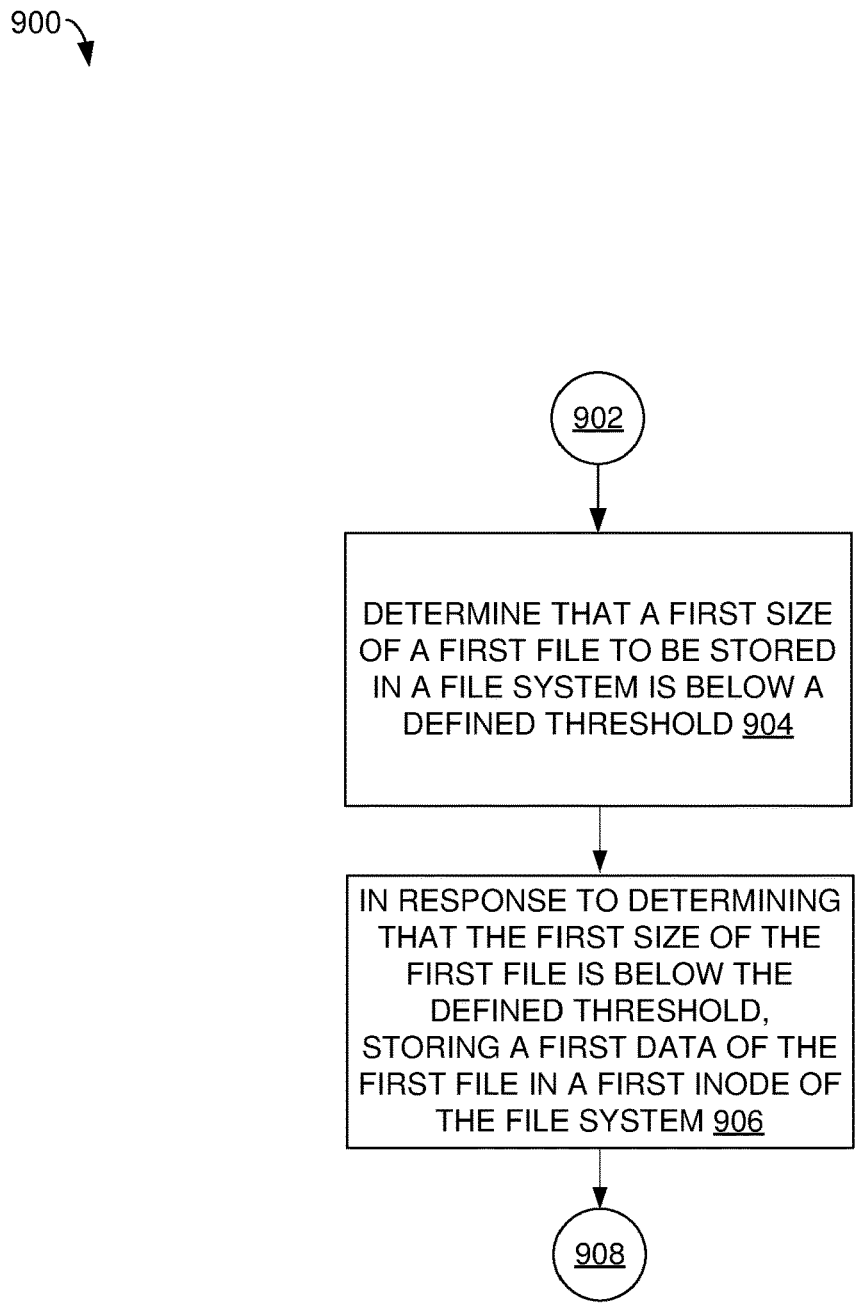
FIG. 9 illustrates an example process flow for inlining data in inodes, in accordance with certain embodiments of this disclosure.

FIG. 9 illustrates an example process flow 900 for inlining data in inodes, in accordance with certain embodiments of this disclosure. It can be appreciated that process flow 900 is an example process flow, and that there can be embodiments that implement more or fewer operations than are depicted in process flow 900, or that implement the operations of process flow 900 in a different order than is depicted in process flow 900.

In some embodiments, process flow 900 can be implemented with server 102 of FIG. 1 as server 102 processes file events from client computer 104. Process flow 900 begins with 902, and then moves to operation 904.

Operation 904 depicts determining that a first size of a first file to be stored in a file system is below a defined threshold. For example, using an example 8KiB inode that has 7,680B reserved for file storage, as described elsewhere, this defined threshold can be 7,681B in size. Where the first file is below this 7,681B (i.e., this first file is no larger than the reserved 7,680B), then it can be determined that it can be possible to inline the file.

In some examples, operation 904 can comprise determining that an amount of available space in a first inode of a file system is at least as large as a first size of a first file to be stored in the file system. In some examples, operation 904 can comprise determining that there is space in a first inode that corresponds to a first file to store the first file. This can involve analyzing an amount of space within the first inode to see if there is enough free space to store the first file. For example, there could be scenarios where more than one file is stored, or a reserved area is otherwise occupied with data.

In some examples, operation 904 can comprise determining whether to store the first file in the first inode based on a size of the first inode. Take a scenario where there are heterogenous inodes because there are different types of disks in a system—some inodes are 512B in size, and other inodes are 8KiB in size. It can be that inlining is permitted for 8KiB inodes, and that inlining is not permitted for 512B inodes. In such a situation, determining whether to inline the inode can involve determining a size of the inode, and not attempting to inline the data where the inode is a 512B inode. However, where it is determined that the inode is a 8KiB inode, then operations can be made to attempt to inline the data (such as determining whether the data has a size below a defined threshold).

In some examples, operation 904 can comprise determining a defined threshold based on a size of the first inode. For example, where inlining data is performed with a 8KiB inode, this defined threshold can be 7,680B. Then, given an example where inlining data is performed with a 512B inode, this defined threshold for a 512B inode can be 389B. After operation 904, process flow 900 of FIG. 9 moves to operation 906.

Operation 906 depicts, in response to determining that the first size of the first file is below the defined threshold, storing a first data of the first file in the first inode. In some examples, operation 906 can comprise in response to determining there is space in the first inode to store the first file, storing the first data of the first file in the first inode. For example, as described elsewhere, an inode can have a reserved dynamic area in which data and/or dynamic attributes can be stored. In such examples, operation 906 can comprise writing the first file to this reserved dynamic area of the inode.

In some examples, operation 906 can comprise mirroring the first file in the file system as part of mirroring the first inode in the file system. In some system architectures, inodes are mirrored—a second copy of the inode is also stored to disk (or memory). By storing multiple copies of the inode, a risk of data loss is protected—if a portion of disk storing one inode is corrupted or otherwise damaged, the portion of disk storing the other inode may still store the correct information.

In some examples, files stored in data blocks are provided protection via things such as protection groups and protection blocks, some of which can involve the use of error correction codes, such as CRCs, which use computing resources to determine and maintain. When a file is stored within an inode that is mirrored, this mirroring achieves a level of data protection, so these other protection approaches (protection blocks, protection groups, etc.) can be omitted. By omitting these other protection approaches, computing resources (both storage and processing) can be conserved.

In some examples, files stored in a first directory of the file system are permitted to be stored in inodes, and wherein files stored in a second directory of the file system are prohibited from being stored in inodes Inlining data in inodes can be performed on a per-directory basis. In some examples, a system administrator can set a flag in a file system for one or more directories, and this flag can be consulted to determine whether inlining data is permitted in the directory, before attempting to inline data in the directory.

Where inlining data is not permitted for a directory, data can be stored in data blocks. Where inlining data is permitted for a directory, data can be stored in inodes where the data is small enough, and otherwise be stored in data blocks.

In some examples, the first inode has a top and a bottom, the first file is written from the top of the first inode, and a dynamic attribute is written from the bottom of the first inode. In some examples, an inode can be a contiguous set of bytes stored on disk. This contiguous set of bytes can be considered to have a beginning and an end, a top and a bottom, or two different ends. In some examples where both data and dynamic attributes are written to an inode, data can be written from one end (the top) of the inode in the inode's dynamic area, dynamic attributes can be written from the other end (the bottom) of the inode in the inode's dynamic area, and the data and dynamic attributes can grow toward each other (i.e., as they continue to grow in size, they will approach the other's location, and possibly collide, where there is not enough space in the inode to store both the data and the dynamic attributes).

In some examples, the first inode stores a first dynamic attribute, and operation 906 can comprise storing the first data of the first file and the first dynamic attribute in a same portion of the first inode. In contrast to growing data and dynamic attributes from different ends of an inode's dynamic area, there can also be an example where data and dynamic attributes are intermingled in the dynamic area, and both are written from the same end of the dynamic area.

In some examples, the first inode comprises a data structure of the file system that stores at least one attribute corresponding to the first file, and the first file or an identification of where the first file is stored. That is, the inode can store dynamic attributes, which can comprise at least one attribute corresponding to the first file. The inode can also store either the first file (data inlining), or an identification of where the first file is stored in another data block (a metadata tree).

After operation 906, process flow 900 of FIG. 9 moves to 908, where process flow 900 of FIG. 9 ends.

Figure 10:
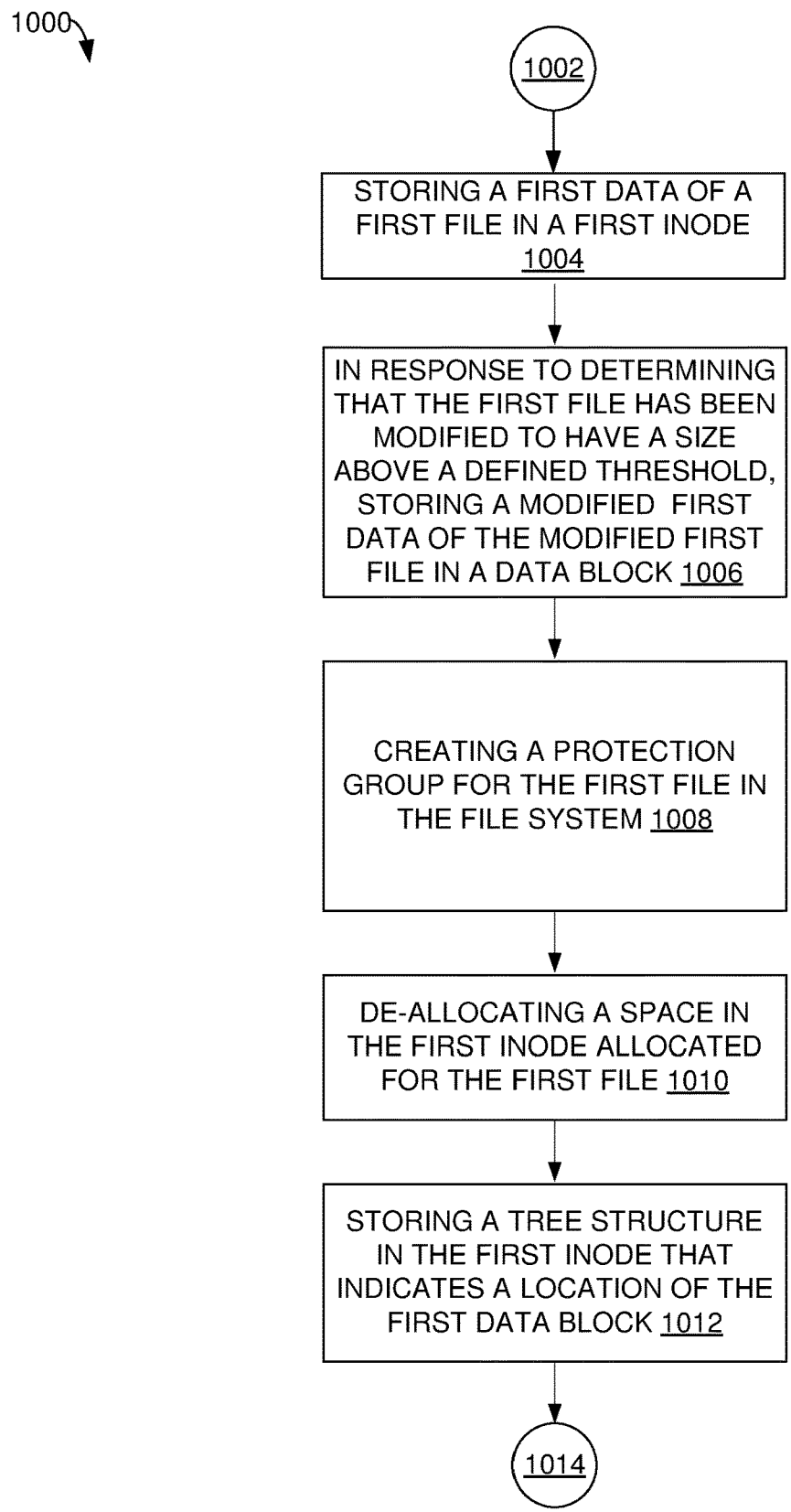
FIG. 10 illustrates an example process flow for moving a data file from being inlined to a data inode, in accordance with certain embodiments of this disclosure.

FIG. 10 illustrates an example process flow 1000 for moving a data file from being inlined to a data block, in accordance with certain embodiments of this disclosure. It can be appreciated that process flow 1000 is an example process flow, and that there can be embodiments that implement more or fewer operations than are depicted in process flow 1000, or that implement the operations of process flow 1000 in a different order than is depicted in process flow 1000.

In some embodiments, process flow 1000 can be implemented with server 102 of FIG. 1 as server 102 processes file events from client computer 104. Process flow 1000 begins with 1002, and then moves to operation 1004.

Operation 1004 depicts storing a first data of a first file in a first inode. In some examples, operation 1004 can be implemented in a similar manner as process flow 900 of FIG. 9. After operation 1004, process flow 1000 moves to operation 1006.

Operation 1006 depicts, in response to determining that the first file has been modified to a modified first file so as to have a modified first size that is above a defined threshold, storing a modified first data of the modified first file in a first data block of the file system that is separate from the first inode. Where a file is inlined in an inode, it may later grow to be too large to be inlined. For example, after being originally created (and inlined), the file can later be written to, causing it to become too large to be inlined In such a case, the file can be stored in a data block, rather than being inlined.

After operation 1006, process flow 1000 of FIG. 10 moves to operation 1008.

Operation 1008 depicts, in response to storing a modified first data of the modified first file in the first data block, creating a protection group for the first file in the file system. Where a file is stored in a data block, a protection group may be created for that file and data block. In some examples, a protection group is not created for an inode, so does not exist where the file is inlined in an inode.

After operation 1008, process flow 1000 of FIG. 10 moves to operation 1010.

Operation 1010 depicts de-allocating a space in the first inode allocated for the first file. Where the file is now stored in a data block, the portion of the inode that has been used to store the file can now be used to store other information, such as a metadata tree and/or dynamic attributes. This can involve storing an indication that this previously-used space in the inode is now free to store other information.

After operation 1010, process flow 1000 of FIG. 10 moves to operation 1012.

Operation 1012 depicts storing a tree structure in the first inode that indicates a location of the first data block. Where a file is moved from being inlined to an inode to being stored in a data block, a metadata tree can be stored in the inode to identify information such as a location of the data block, and a location of the protection group.

After operation 1012, process flow 1000 of FIG. 10 moves to 1014, where process flow 1000 of FIG. 10 ends.

Figure 11:
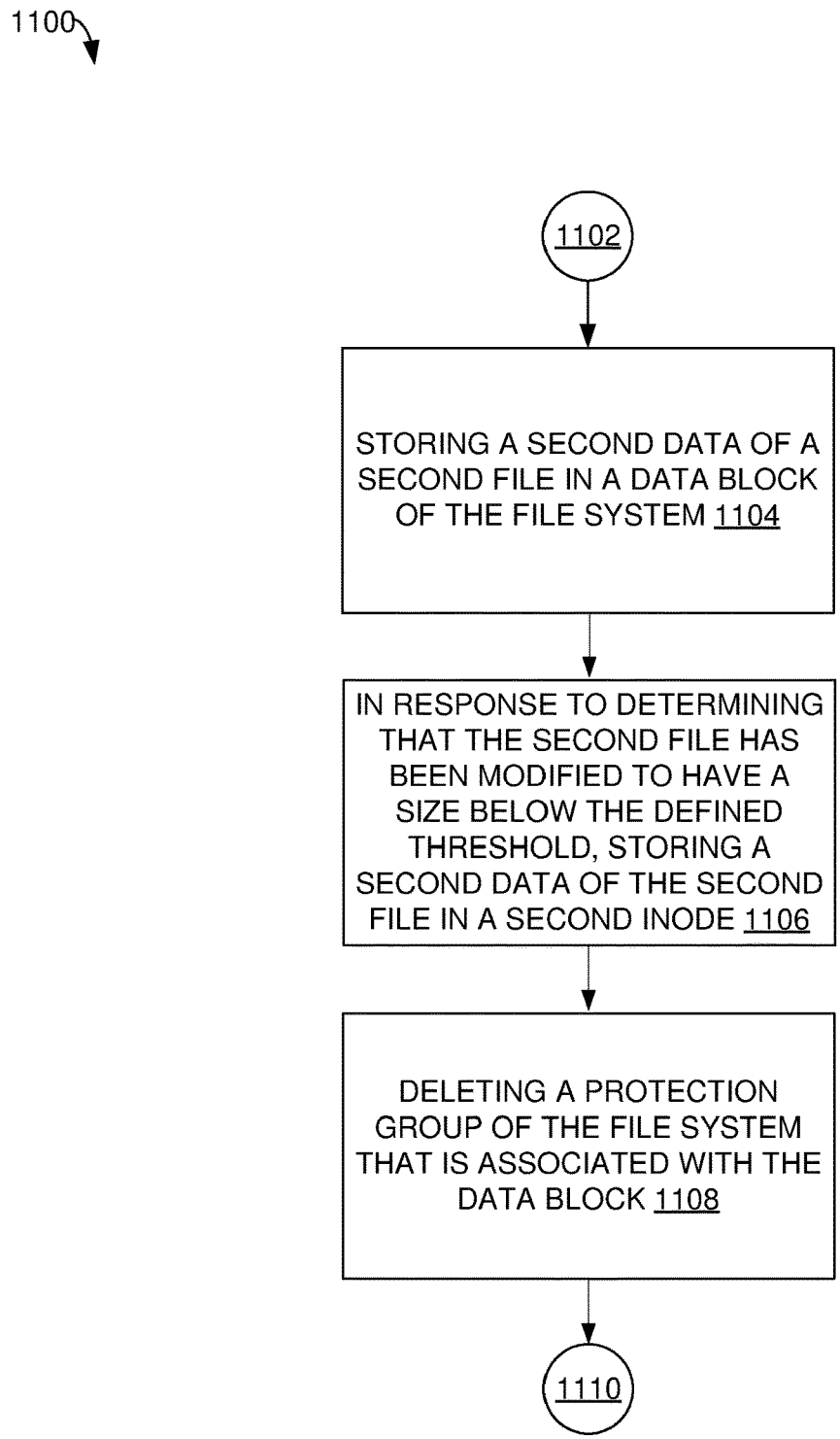
FIG. 11 illustrates an example process flow for moving a data file from a data inode to being inlined, in accordance with certain embodiments of this disclosure.

FIG. 11 illustrates an example process flow 1100 for moving a data file from a data block to being inlined, in accordance with certain embodiments of this disclosure. It can be appreciated that process flow 1100 is an example process flow, and that there can be embodiments that implement more or fewer operations than are depicted in process flow 1100, or that implement the operations of process flow 1100 in a different order than is depicted in process flow 1100.

In some embodiments, process flow 1100 can be implemented with server 102 of FIG. 1 as server 102 processes file events from client computer 104. Process flow 1100 begins with 1102, and then moves to operation 1104.

Operation 1104 depicts storing a second data of a second file in a data block of the file system. In some examples, this can be effectuated in a similar manner as writing a file to a file system where data inlining in inodes is not performed. In some examples, the second file can be written to a data block because it is too large to be inlined, or because, at the time that it is stored, inlining is not permitted for the associated directory of the file system in which it is being stored.

In some examples, the data block is separate from a second inode that corresponds to the second file. That is, while data can be inlined in inodes, in some examples, inodes and data blocks can be distinguished from each other as two different types of data structures in a file system. After operation 1104, process flow 1100 of FIG. 11 moves to operation 1106.

Operation 1106 depicts, in response to determining that the second file has been modified to a modified second file so as to have a modified second size that is below the defined threshold, storing a modified second data of the modified second file in the second inode. After the file has been written to a data block, it can be modified to have a smaller size (e.g., the file gets truncated), and then the new size can be small enough to inline in an inode. Where this occurs, the file can then be inlined in an inode rather than being stored in a data block. After operation 1106, process flow 1100 of FIG. 11 moves to operation 1108.

Operation 1108 depicts, in response to storing the modified second data of the modified second file in the second inode, deleting a protection group of the file system that is associated with the data block. When the file is switched from being stored in a data block to being inlined in an inode, then various data structures associated with storing a file in a data block can be de-allocated or deleted. For example, the data block itself can be de-allocated or deleted, as can an associated protection block, and an associated protection group.

After operation 1108, process flow 1100 of FIG. 11 moves to 1110, where process flow 1100 of FIG. 11 ends.

Figure 12:
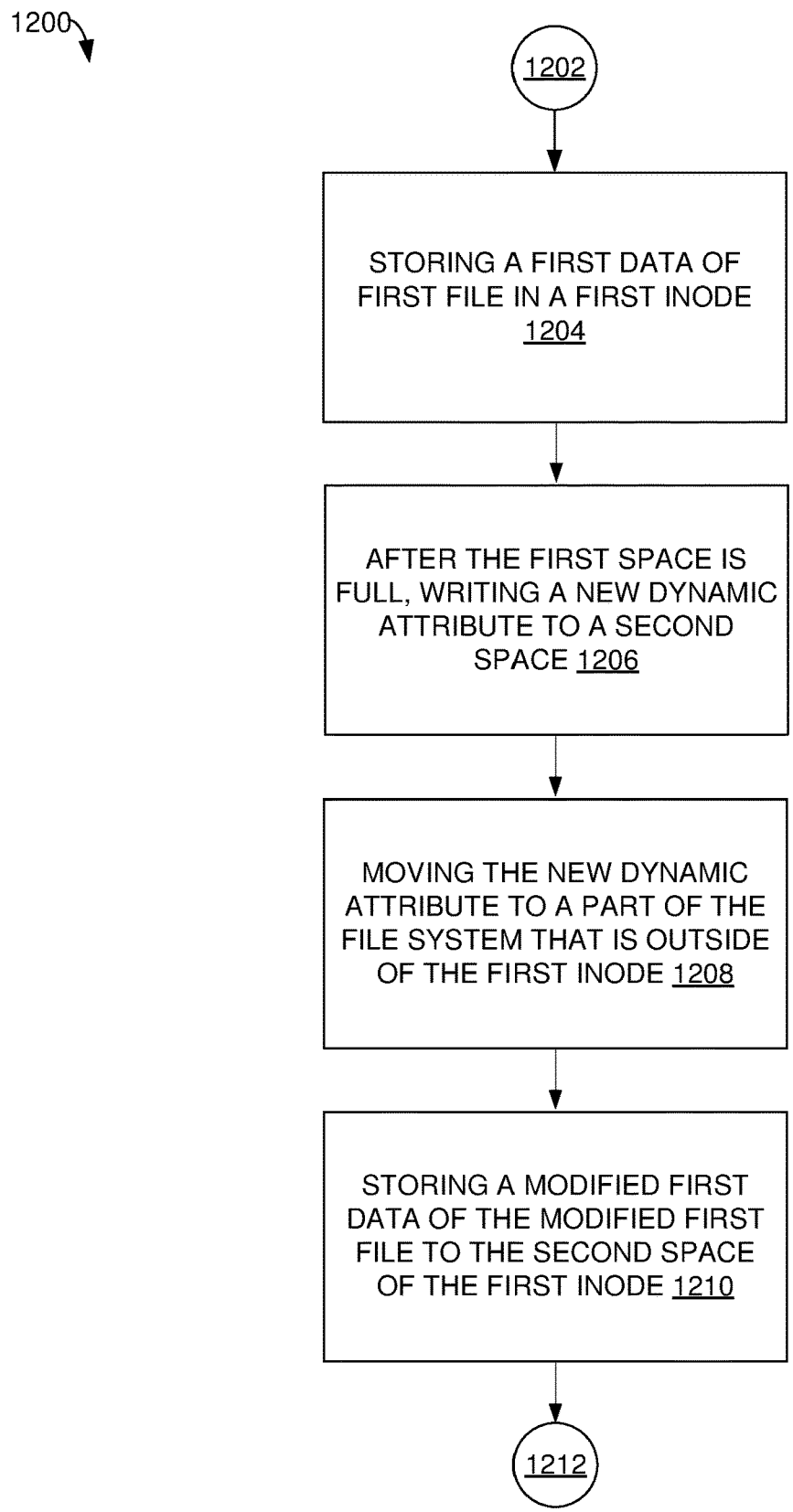
FIG. 12 illustrates an example process flow for moving dynamic attributes between inodes, in accordance with certain embodiments of this disclosure.

FIG. 12 illustrates an example process flow 1200 for moving dynamic attributes between inodes, in accordance with certain embodiments of this disclosure. It can be appreciated that process flow 1200 is an example process flow, and that there can be embodiments that implement more or fewer operations than are depicted in process flow 1100, or that implement the operations of process flow 1200 in a different order than is depicted in process flow 1100.

In some embodiments, process flow 1200 can be implemented with server 102 of FIG. 1 as server 102 processes file events from client computer 104. Process flow 1200 begins with 1202, and then moves to operation 1204.

Operation 1204 depicts storing a first data of a first file in a first inode. In some examples, operation 1004 can be implemented in a similar manner as process flow 900 of FIG. 9. After operation 1204, process flow 1200 of FIG. 12 moves to operation 1206.

Operation 1206 depicts an example where a first space of the first inode is reserved for dynamic attributes, and a second space of the first inode is used to write the first file. Operation 1206 depicts after the first space is full, writing a new dynamic attribute to the second space. Take an example of a 8KiB inode, with a dynamic area comprising 389B that are reserved for dynamic attributes and 7,680B that are reserved for data storage. As described elsewhere, the data can be written in the dynamic area from the top down, and the dynamic attributes can be written in the dynamic area from the bottom up.

In some examples, where the dynamic attributes exceed 389B, they can continue to be written to the dynamic area, so long as they do not collide with the data (i.e., so long as there is enough space to store the data in the 7,680B reserved for data). In this example, this 389B can be the first space of the first inode reserved for dynamic attributes, and this 7,680B can be the second space of the first inode used to write the first file. After operation 1206, process flow 1200 of FIG. 12 moves to operation 1208.

Operation 1208 depicts, in response to determining that the first file is modified to have a second size that is below a defined threshold, and further that there is not space in the second space because of the new dynamic attribute, moving the new dynamic attribute to a part of the file system that is outside of the first inode. Where there is a collision between the file and the dynamic attributes, the dynamic attributes subject to the collision (e.g., in the example where there are 389B reserved for dynamic attributes, those dynamic attributes above the 389B space) can be moved to a metadata block and stored there. By moving those dynamic attributes out of the 7,680B reserved for data (to continue with the 8 KiB inode example from above), then up to a 7,680B file can be inlined in the inode. After operation 1208, process flow 1200 of FIG. 12 moves to operation 1210.

Operation 1210 depicts storing a modified first data of the modified first file to the second space of the first inode. In some examples, operation 1210 can be implemented in a similar manner as operation 906 of FIG. 9. After operation 1210, process flow 1200 of FIG. 12 moves to 1212, where process flow 1200 of FIG. 12 ends.

EXAMPLE OPERATING ENVIRONMENTS

To provide further context for various aspects of the subject specification, FIG. 13 illustrates a block diagram of a computer 1302 operable to execute the disclosed storage architecture in accordance with aspects described herein. For example, aspects of computer 1302 can be used to server 102 of FIG. 1, and aspects of computer 1302 can be used to implement client computer 106 of FIG. 1.

FIG. 13 illustrates a block diagram of a computer 1302 operable to execute the disclosed communication architecture. To provide additional context for various aspects of the disclosed subject matter, FIG. 13 and the following discussion are intended to provide a brief, general description of a suitable computing environment 1300 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices can include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read-only memory (ROM), electrically erasable programmable read-only memory (EEPROM), flash memory or other memory technology, compact disc read only memory (CD-ROM), digital versatile disc (DVD; sometimes referred to as digital video disc) or other optical disc storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals can refer to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 13, the example environment 1300 for implementing various aspects of the specification includes a computer 1302, the computer 1302 including a processing unit 1304, a system memory 1306 and a system bus 1308. As an example, the component(s), server(s), node(s), cluster(s), system(s), and/or device(s) disclosed herein can each include at least a portion of the computer 1302. The system bus 1308 can couple system components including, but not limited to, the system memory 1306 to the processing unit 1304. The processing unit 1304 can be any of various commercially-available or custom processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 can include ROM 1310 and RAM 1312. A basic input/output system (BIOS) can be stored in a non-volatile memory 1310 such as ROM, erasable programmable read-only memory (EPROM), EEPROM, where the BIOS can contain the basic routines that help to transfer information between elements within the computer 1302, such as during startup. The RAM 1312 can also include a high-speed RAM such as static RAM for caching data, or NVRAM.

The computer 1302 further includes an internal hard disk drive (HDD) 1314, which internal hard disk drive 1314 can also be configured for external use in a suitable chassis (not shown), a magnetic floppy disk drive (FDD) 1316, (e.g., to read from or write to a removable diskette 1318) and an optical disc drive 1320, (e.g., reading a CD-ROM disc 1322 or, to read from or write to other high capacity optical media such as the DVD). The hard disk drive 1314, magnetic disk drive 1316 and optical disc drive 1320 can be connected to the system bus 1308 by a hard disk drive interface 1324, a magnetic disk drive interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the subject disclosure.

The drives and their associated computer-readable storage media can provide nonvolatile storage of data, data structures, computer-executable instructions, and so forth. For the computer 1302, the drives and storage media can accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

Many program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the specification can be implemented with various commercially available operating systems or combinations of operating systems.

A user can enter commands and information into the computer 1302 through one or more wired or wireless input devices, e.g., a keyboard 1338 and/or a pointing device, such as a mouse 1340 or a touch screen or touchpad (not illustrated). These and other input devices can be connected to the processing unit 1304 through an input device interface 1342 that is coupled to the system bus 1308, but can be connected by other interfaces, such as a parallel port, an IEEE 1394 port, a game port, a USB port, an infrared (IR) interface, etc. A monitor 1344 or other type of display device can also be connected to the system bus 1308 via an interface, such as a video adapter 1346.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and can include many or all the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments can be commonplace in offices and companies, and facilitate enterprise-wide computer networks, such as intranets, all of which can connect to a global communications network, e.g., the Internet.

When used in a LAN networking environment, the computer 1302 is connected to the local network 1352 through a wired and/or wireless communication network interface or adapter 1356. The adapter 1356 can facilitate wired or wireless communication to the LAN 1352, which can also include a wireless access point disposed thereon for communicating with the wireless adapter 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, can be connected to the system bus 1308 via the serial port interface 1342. In a networked environment, program modules depicted relative to the computer 1302, or portions thereof, can be stored in the remote memory/storage device 1350. It will be appreciated that the network connections shown are example and other means of establishing a communications link between the computers can be used.

The computer 1302 can be operable to communicate with any wireless devices or entities operatively disposed in wireless communication, e.g., desktop and/or portable computer, server, communications satellite, etc. This includes at least Wireless Fidelity (Wi-Fi) and BLUETOOTH wireless technologies. Thus, the communication can be a predefined structure as with a conventional network or simply an ad hoc communication between at least two devices.

Wi-Fi can allow a connection to the Internet from a couch at home, a bed in a hotel room, or a conference room at work, without wires. Wi-Fi can be a wireless technology similar to that used in a cell phone that enables such devices, e.g., computers, to send and receive data indoors and out; anywhere within the range of a base station. Wi-Fi networks can use radio technologies called IEEE 802.11 (a, b, g, n, etc.) to provide secure, reliable, fast wireless connectivity. A Wi-Fi network can be used to connect computers to each other, to the Internet, and to wired networks (which can use an IEEE 802.3 standard or Ethernet). Wi-Fi networks can operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data "storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
storing a first dynamic attribute in a first portion of a first inode of the file system, the first portion of the first inode comprising a first capability to store dynamic attributes;
determining that a first size of a first file to be stored in a file system is below a defined threshold;
in response to determining that the first size of the first file is below the defined threshold, storing the first file in a second portion of the first inode of the file system, the second portion for the first inode comprising a second capability to store dynamic attributes and files, wherein file storage in the second portion is assigned a higher priority than dynamic attribute storage in the second portion;
in response to determining that the first portion is full, storing a second dynamic attribute to the second portion; and
in response to determining that the first file has been modified to a modified first file having a second size that is below the defined threshold, wherein the second size is greater than an amount of free space in the second portion, moving the second dynamic attribute to a part of the file system that is outside of the first inode as a result of the second dynamic attribute having a lower priority for being stored in the second portion than the modified first file, and storing the modified first file in the second portion of the first inode.

2. The system of claim 1, wherein the operations further comprise:
determining that a third size of a second file to be stored in the file system is above the defined threshold; and
storing the second file in a first group of one or more data blocks of the file system.

3. The system of claim 2, wherein the second first group of one or more data blocks is separate from a second inode that identifies the second file.

4. The system of claim 2, wherein the operations further comprise:
in response to determining that the second file has been modified to a modified second file, resulting in a fourth size that is below the defined threshold, moving the modified second file from the second group of one or more data blocks and into the second inode.

5. The system of claim 4, wherein the operations further comprise:
in response to the moving the modified second file from the second group of one or more data blocks and into the second inode, deleting a protection group of the file system that is associated with the second group of one or more data blocks.

6. The system of claim 1, wherein first files stored in a first directory of the file system are permitted to be stored in inodes of the file system, and wherein second files stored in a second directory of the file system are required to be stored outside of the inodes.

7. The system of claim 1, wherein the operations further comprise:
mirroring the first file in the file system as part of mirroring the first inode in the file system.

8. The system of claim 1, wherein the first dynamic attribute has a first priority wherein the first inode comprises a second dynamic attribute with a second priority, and wherein the operations further comprise:
in response to determining to free up space within the first inode, moving the first dynamic attribute out of the first inode based on the first priority of the first dynamic attribute being lower than the second priority of the second dynamic attribute.

9. A method, comprising:
storing, by a system comprising a processor, a dynamic attribute in a portion of an inode of a file system, the portion of the first inode being configured to give a higher priority to storing file data than to storing dynamic attributes;

determining, by the system, that an amount of available space in the portion is smaller than a size of a file to be stored in the file system, and that a total size of the portion is at least as large as the first size of the first file; and in response to the determining, moving the dynamic attribute to a part of the file system that is outside of the inode, and storing the file in the portion of the inode.

10. The method of claim 9, further comprising:
in response to moving the file to a group of data blocks, creating, by the system, a protection group for the file in the file system.

11. The method of claim 9, further comprising:
storing, by the system, a tree structure in the inode that indicates a location of the group of data blocks.

12. The method of claim 9, further comprising:
de-allocating, by the system, a subset of space within the inode allocated for the file.

13. The method of claim 9, wherein the inode comprises a top portion and a bottom portion, and wherein the file is written from the top portion of the inode toward the bottom portion, wherein a dynamic attribute is written from the bottom portion of the first inode toward the top portion, and wherein a free space of the inode is located between the first file and the dynamic attribute.

14. The method of claim 9, wherein the inode comprises a data structure of the file system that stores at least one attribute corresponding to the file, and the file or an identification of where the file is stored.

15. The method of claim 9, wherein the file is a first file, wherein the inode is a first inode, and further comprising:
in response to determining that a second file stored in a group of data blocks has been modified to a modified second file, resulting in a third size that is within an amount of available space of a second inode, moving the modified second file from the group of data blocks and into the second inode.

16. The method of claim 9, wherein the inode stores dynamic attributes, and further comprising:
storing the file and the dynamic attributes intermingled within the inode.

17. The method of claim 9, further comprising:
determining whether to store the file in the inode based on an overall size of the inode, the overall size of the inode comprising both a free space of the inode and a used space of the inode.

18. A non-transitory computer-readable medium comprising instructions that, in response to execution, cause a system comprising a processor to perform operations, comprising:
determining that a file has a first size that is below a second size of a portion of an inode of a file system, the portion being prioritized to store file data over storing dynamic attribute data;

in response to determining that an amount of free space in the portion is smaller than the first size, moving a dynamic attribute stored in the portion to a part of the file system that is outside of the inode; and after moving the dynamic attribute, storing the file in the portion of the inode.

19. The non-transitory computer-readable medium of claim 18, wherein the inode stores a plurality of dynamic attributes, and wherein the operations further comprise:
storing the file and the plurality of dynamic attributes intermingled within the inode.

20. The non-transitory computer-readable medium of claim 18, wherein the operations further comprise:
determining whether to store the file in the inode based on an overall size of the inode, the overall size of the inode comprising both a free space of the first inode and a used space of the inode.

* * * * *